Figure 3:
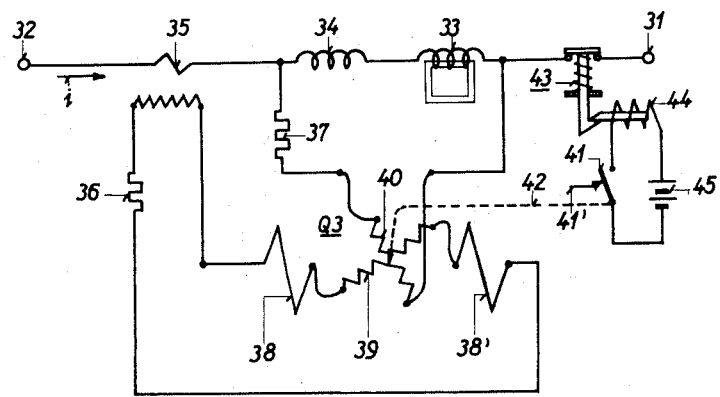

Nov. 28, 1950     F. KESSELRING     2,531,443
CONTROL APPARATUS FOR ALTERNATING CURRENT
Filed June 13, 1947     3 Sheets-Sheet 1
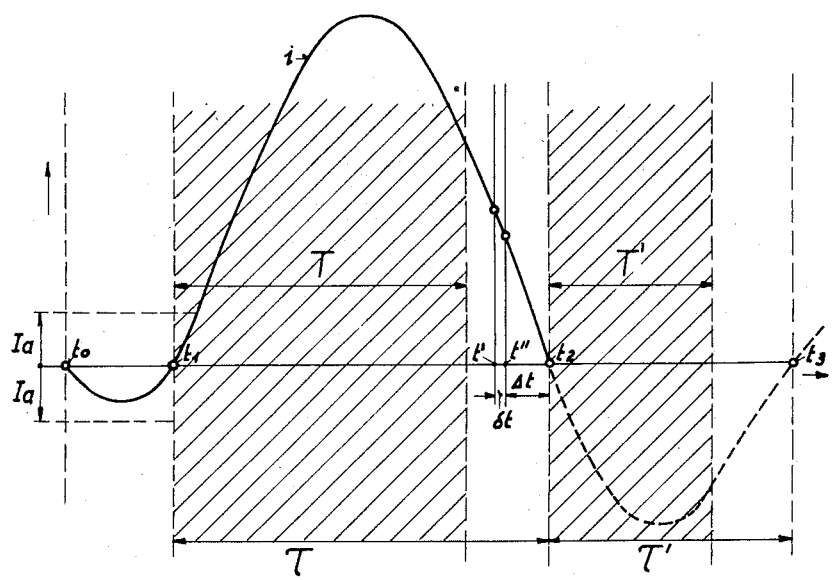
Fig.1
Fig.1a
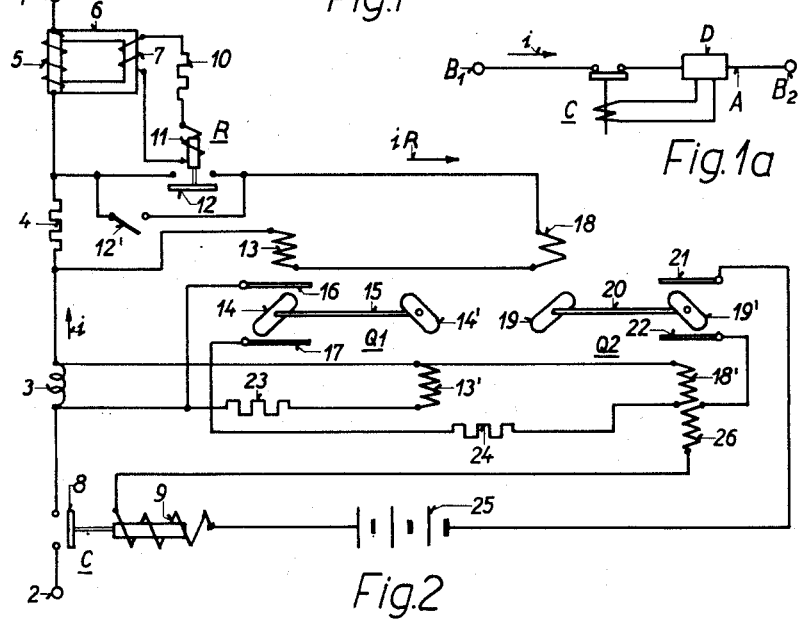
Fig.2
INVENTOR
Fritz Kesselring.
BY
ATTORNEY.

INVENTOR
Fritz Kesselring.
BY
ATTORNEY.

Nov. 28, 1950 F. KESSELRING 2,531,443
CONTROL APPARATUS FOR ALTERNATING CURRENT
Filed June 13, 1947 3 Sheets-Sheet 3

INVENTOR
Fritz Kesselring.
BY
ATTORNEY.

Patented Nov. 28, 1950

2,531,443

UNITED STATES PATENT OFFICE 2,531,443

CONTROL APPARATUS FOR ALTERNATING CURRENT

Fritz Kesselring, Zollikon-Zurich, Switzerland, assignor to FKG Fritz Kesselring Gerätebau Aktiengesellschaft, Bachtobel-Weinfelden, a Swiss company Application June 13, 1947, Serial No. 754,498
In Switzerland June 17, 1946

10 Claims. (Cl. 175—294)

My invention relates to condition-responsive control apparatus for performing or controlling an operation at a moment of predetermined time relation to the cycle period or zero passages of an alternating current or voltage. Such apparatus are designed as, or applicable in conjunction with, circuit breakers, welding control devices and similarly operating circuit interrupters and contactors, commutating or translating devices such as rectifiers and converters, and other apparatus that require the issuance of a control stimulus at a singular phase point of a current or voltage wave.

In known synchronous switches, an interrupter contact is supposed to start opening a circuit at a moment which precedes the current zero passage such a period of time that the distance between the separating contacts at the moment of zero passage is large enough to prevent the re-ignition of an arc. The current-responsive control means of these known synchronous switches are far from perfect. Although they issue a control impulse to the circuit breaker proper at small current values near a zero passage, the control effect may occur not only before the zero passage when it is desired but also after a zero passage. In the latter event, an arc may persist during a virtually full half-wave period. This imposes a considerable limitation on the degree of obtainable protection and tends to damage the contacts and other equipment associated with the switch or with the circuit controlled thereby.

It is an object of my invention to provide alternating-current control apparatus, of the type and for the purposes mentioned, that eliminate such shortcomings and afford an improved accuracy of performance and a higher degree of protection. Another object, more specifically, is to devise a control apparatus of the above-mentioned kind that is capable of discriminating between ascend and descend of a current or voltage wave so as to respond only at a time point of univocal relation to the preceding zero passage of the wave. It is also among the objects of the invention to provide control apparatus that, while affording the mentioned advantages, are of a simple and spacially condensed design, that are capable of application for low as well as very high voltages, and that lend themselves readily to being used or designed for widely diversified control purposes as referred to in the foregoing.

According to my invention, I equip alternating-current control apparatus, for the issuance of phase-predetermined control stimula, with means for temporarily blocking such issuance, and I associate or integrate the blocking means with condition-responsive sensing means that react to given conditions of the controlling alternating-current wave so as to maintain the blocking effect only a definite interval of time beginning with a zero passage and ending before the next zero passage.

These and other features of my invention will be explained and exemplified below with reference to the drawings in which Figure 1 is an explanatory coordinate diagram of current and time conditions essential for the invention, and Fig. 1a is a schematic showing of a synchronous switch system also for the purpose of explaining the invention, while Figs. 2 to 6 represent the circuit diagrams of different embodiments of the basic invention respectively.

A complete understanding of the illustrated embodiments requires familiarity with the circuit conditions and essential features of the invention. Hence, the explanatory diagrams of Figs. 1 and 1a will first be dealt with before presenting more detailed descriptions.

Current-time conditions as exemplified by Fig. 1 may occur in a synchronous switch system as shown in Fig. 1a. The alternating current, denoted by the arrow $i$, flows in the circuit A between terminals $B_1$ and $B_2$ through the normally closed contact of a switch C and through the control apparatus D which causes the switch C to open the circuit under overload conditions at a moment of predetermined time relation to the current cycle or its zero passage.

The curve $i$ in Fig. 1 represents the alternating current under overload conditions. As shown, this current may have general wave shape, i. e. it is not necessarily sinusoidal. The time points of several current zero passages are denoted by $t_0$, $t_1$, $t_2$ and $t_3$. The distances T and T' represent each a period of time between two successive zero passages. This period, in a general case, may have any magnitude and may be different between respective pairs of zero passages. At the time point $t'$, the control apparatus (D in Fig. 1a) responds to the overload condition of current $i$. A slight interval of time ($\delta t$) later, at the moment $t''$, the switch (C in Fig. 1a) starts opening its contact so that an interval $\Delta t$ elapses before the current $i$ passes through zero at the moment $t_2$. The interval $\delta t$ represents the delay inherent in the operation of the control apparatus (D) and is hereinafter called "response interval." This interval extends substantially from the moment where the current conditions pass through the value suitable for the response of the control apparatus until the moment when a control impulse is issued by the control apparatus. The interval $\Delta t$ is hereinafter called "switching interval." It has the duration desired for optimum switching performance. As mentioned, the invention provides means which prevent the control apparatus (D in Fig. 1a) from responding during "blocking periods" each beginning at the moment of a zero passage. Such blocking periods are exemplified in Fig. 1 by the distances marked T and T'. The broken horizontal lines $Ia$ denote a critical current value which must be exceeded by the overload current $i$ before any response of apparatus D is desired.

Although the current $i$ during the period $t_0 - t_1$ is an unload, its amplitude remains below the critical current $Ia$. Hence, there is no release of the synchronous switch before the zero passage $t_1$. However, in the above-mentioned known switch systems (i. e. in the absence of a blocking effect), the release would occur shortly after the moment $t_1$ as soon as the current $i$ rises above the value $Ia$. An arc would be drawn and would continue to burn during the rest of the period $t_1 - t_2$ until it extinguishes at the moment $t_2$ of the next zero passage. This lasting arc, fed temporarily by high current, is apt to damage the switch and the circuits and devices to be protected thereby.

Such occurrences are prevented by the invention due to the fact that the issuance of a control impulse is temporarily blocked after each zero passage. The control apparatus is permitted to respond only shortly before the zero passage $t_2$ so that the time during which an arc can exist is limited to the short interval $\Delta t$; and the current feeding the arc is likewise small. Similarly, favorable results obtain if the conditions are such that the interruption takes place shortly before the zero passage $t_3$. Then the response of the control apparatus is blocked immediately after the preceding zero moment $t_2$.

For some applications, the blocking period T can be kept larger than represented in Fig. 1. For instance, the period can be made equal to $\tau - \Delta t$. This has the advantage of permitting the application of rather simple control devices. For instance, a single electromagnetic relay energized by the controlling alternating current may then be provided for issuing the releasing control impulse.

In other cases, a blocking period of shorter duration than represented in Fig. 1 is satisfactory. For instance, if relay means are used which, as in the known synchronous switch systems, respond only shortly before or only shortly after a current zero passage and remain in a position of rest during the remaining portion of the cycle period, then the blocking period need not be longer than from the zero passage to the next following current maximum. With relay means of the last-mentioned kind, it is even feasible to keep the blocking period only slightly larger than the amount of $\Delta t$, because after the elapse of that blocking period, the current $i$ is already too high for an immediate response of this type of relay so that a premature response is prevented.

In one aspect of my invention, I provide the control apparatus with two relay systems, one for issuing the control impulse and the other for blocking the control performance. Such an apparatus may be designed so that the blocking relay system releases the impulse transmitting system for operation only after the elapse of a blocking period not shorter than the value $\Delta t$ counted from a current zero passage, while the impulse transmitting system, then free to issue an impulse, responds not later than at a moment at least the amount $\Delta t$ ahead of the next current zero passage. An embodiment of such an apparatus will be described below with reference to Fig. 2. According to another feature of the invention, one or both of the two relay systems are designed for response to a given absolute value of the ratio $$\frac{i}{di/dt}$$

the first relay system performing its blocking function until the moment when this value is exceeded; while, thereafter, the second system responds and issues a control stimulus at the moment when the ratio again drops below this value.

If the blocking period (T) is to extend from the zero passage to the moment of the next following current maximum, a blocking relay system may be used that responds to a given minimum value of $di/dt$. Such a response is obtainable, for instance, by means of an electromagnetic relay whose electromagnet is connected in parallel to a choke coil and whose armature is pulled away from the magnet by a spring when the value $di/dt$ approaches zero, i. e. when the current $i$ reaches its maximum value.

One of the ways, according to the invention, of extending the blocking period close to the moment $(t'')$ of impulse emission is to make the blocking relay system responsive to a voltage peak taken from across a premagnetized saturable reactor whose iron-cored reactance coil is traversed by the alternating current, the premagnetization being chosen so that the period of time between the voltage peak and the subsequent current zero passage is somewhat larger than $\Delta t$. In order to secure this performance under all operating conditions, the magnitude of the direct-current premagnetization is preferably varied in accordance with the magnitude of the current $i$.

A simplification of control apparatus according to the invention can be achieved by taking advantage of the fact that the values of $i$ and $di/dt$ have opposite directions of change before each zero passage of the current, while they are of the same direction after each zero passage. Consequently, the blocking system can be designed so that it terminates its blocking effect when the product $i.di/dt$ becomes negative. Such a blocking system may be designed as a dynamometric measuring system.

In another aspect of my invention, the blocking function, as well as the function of issuing control impulses shortly before the zero passage, is performed by a single relay system so that the blocking function terminates when the ratio $$\frac{i}{di/dt}$$

becomes negative, while the impulse transmission occurs when this ratio passes through a given value, for instance the value $\Delta t$. To this end, relay systems are to be employed which measure the algebraic value of this ratio. For instance, the relay systems may be designed in the manner of crossed-coil or crossed-armature instruments.

One might expect that any relay system capable of measuring the absolute or algebraic value of the ratio $$\frac{i}{di/dt}$$

would operate to issue a control impulse always at the desired time $\Delta t$ before the current zero passage. In reality, each relay system, however slight its weight, has a finite mass which must be accelerated and must move a finite distance, however small it may be, before the control impulse becomes effective; and the accelerating forces acting on the mass are stronger at high current values than at low values. Consequently, though the response interval $\delta t$ of the control apparatus can be kept within negligible limits at large current values, this interval, in general, is considerably longer at smaller currents.

In order to avoid this drawback, the apparatus is preferably designed so that the interval $\delta t$ varies in dependence upon the magnitude of the immediately preceding current maximum. More particularly, the variation should be such that the interval $\delta t$ increases with decreasing value of the preceding current maximum so that the issuance of the control impulse occurs at about a moment an interval $\Delta t$ ahead of the current zero passage under all load conditions. Under high short-circuit currents, the response value of the control apparatus is then reached closely before the moment $\Delta t$, while this value is reached correspondingly earlier when the overload current is of low magnitude or when the apparatus operates in response to the rated current. Incidentally, it is not detrimental if, at small currents, the control impulse is issued at a somewhat earlier moment, i. e. at somewhat larger values of $\Delta t$.

In order to keep the switching interval $\Delta t$ very small, for instance in the order of magnitude of $10^{-4}$ seconds or less, it may be essential to avoid connecting the current coil of such a control apparatus through a current transformer or shunt, because such a connection may involve a phase error between primary and secondary currents. It is then preferable to connect the current coil of the apparatus to the load circuit so that the load current $i$ flows directly through the coil. The magnitude of $di/dt$ changes very little in the vicinity of the current zero passage. Consequently, this value can be measured simply by providing a proportional voltage drop across a reactance or choke coil which is traversed by the alternating current $i$. However, if it is desired to have the control apparatus respond earlier at low overloads, this voltage may be taken from across the series connection of an iron-cored choke coil and an air-cored choke coil, the iron-cored coil having preferably a magnet structure provided with an air gap. Such an arrangement automatically provides the desired effect. This is due to the fact that the iron-cored coil increases its inductive resistance at decreasing currents because of the accompanying increase in magnetic permeability. As a result, an increase in the value of $di/dt$ is simulated so that the balance condition of the ratiometric relay system occurs at correspondingly higher current values. Thus the response of the relay system is caused at a moment which precedes the current zero passage by more than the interval $\Delta t$. The additional air-cored coil has the purpose of securing the desired law of response over the entire range of current from fractions of the rated value up to short-circuit currents. Such a reactance coil arrangement for providing a voltage proportional to the rate of current change ($di/dt$) is applicable in connection with relay systems that measure the absolute value of the ratio $$\frac{i}{di/dt}$$

as well as with systems that respond to the algebraic value of this ratio.

It follows from the foregoing explanations that the control apparatus is capable of issuing a control stimulus shortly previous to the current zero passage provided the immediately preceding maximum value of the current is higher than a given value. In order to render such a control apparatus applicable for general purposes, it is usually necessary to provide additional control devices. For instance, for the control of synchronous switching equipment, an overload responsive relay may be added which renders the control apparatus operable only in response to the occurrence of a given overload amplitude ($Ia$). However, there are cases where it is desired to render the control apparatus operative to interrupt currents appreciably smaller than the rated current, and the control apparatus is then supposed to also provide a control impulse only shortly before the current zero passage. It is therefore also contemplated by the invention to provide a selective device which permits placing the control apparatus in operation under any existing current conditions.

For optimum accuracy and reliability of performance, it is usually desirable to design control apparatus according to the invention so that its response interval $\delta t$ is shorter than the switching interval $\Delta t$ of the switch or other device controlled by the apparatus. For power purposes, for instance, the response period $\delta t$ of the control apparatus should be shorter than about $10^{-4}$ seconds, preferably shorter than $3.10^{-5}$ seconds.

Figure 4:
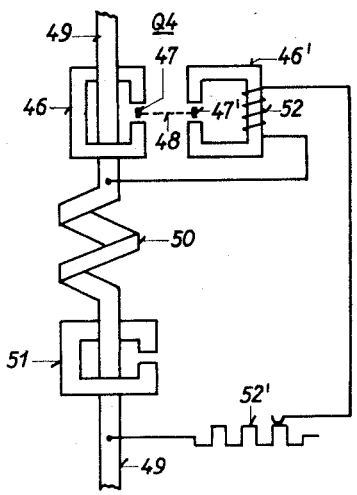

The embodiments illustrated in Figs. 2 to 4 are designed and operative in accordance with the above-mentioned features of the invention. In the embodiment according to Fig. 2, part of the load or power circuit to be protected extends between terminals 1 and 2 and includes in series an inductance coil 3, such as an air-cored coil; a resistor 4 and a choke coil 5 which forms the primary 5 of a transformer 6 whose secondary is denoted by 7. The circuit includes the normally closed contact 8 of a circuit breaker controlled by a tripping or release coil 9.

Secondary 7 of transformer 6 is connected through a resistor 10 with the coil 11 of a relay R whose contact 12 closes when the transformer voltage exceeds a given value and then applies control excitation to two quotient-responsive relays or ratiometers Q1 and Q2. Quotient relays or ratiometers applicable for the purpose of the invention are known in various designs and are, as a rule, equipped with a movable system of two opposingly acting structures, such as moving coils or moving armatures, that are mechanically interconnected and associated with an electromagnet so that the deflection of the system depends upon the quotient or ratio of the respective ampere turns that act upon the two structures of the system. In the illustrated example, the ratiometer Q1 has two coils 13 and 13' acting upon two crossed armatures 14 and 14', respectively, that are rigidly interconnected by a shaft 15 to close two contacts 16 and 17 when the torque of armature 14, due to the energization of coil 13, exceeds the opposing torque of armature 14' caused by coil 13'. Similarly, the illustrated ratiometer Q2 has two coils 18 and 18' acting on two respective armatures 19 and 19' that are rigidly interconnected by a shaft 20 and bridge two contacts 21 and 22 when the torque of armature 19' exceeds that of armature 19.

A contact 12', operable at will, is connected across relay contact 12 in order to permit using the control apparatus under any load conditions, for instance at rated current or below rated current, if desired. When either contact 12' or contact 12 of relay R is closed, coils 13 and 18 are energized by the voltage drop across resistor 4. This voltage drop is proportional to the load current $i$. Hence, the torque imposed by these coils upon armatures 14 and 19 is proportional to the value $i^2$.

Coil 13' of ratiometer Q1 is connected, through a resistor 23, across inductance coil 3 whose ohmic resistance is small so that the voltage normally effective across coil 13' is negligible. However, when the load current changes, an inductive voltage drop proportional to the rate of current change $$\left(\frac{di}{dt}\right)$$

appears across coil 3 so that the torque then imposed on armature 14' is proportional to $$\left(\frac{di}{dt}\right)^2$$

Coil 18' of ratiometer is connected, through a resistor 24, across coil 3, provided contacts 16 and 17 are closed. The torque then imposed on armature 19' by coil 18' is also proportional to $$\left(\frac{di}{dt}\right)^2$$

The switching over occurs in each ratiometer at the moment when the ratio $$\frac{i}{di/dt}$$

exceeds a critical value which is determined by the length of the period $\Delta t + \delta t$. At the moment when relay Q2, subsequently to the response of relay Q1, closes its contact, the coil 9 is energized from a suitable voltage source 25 and releases the switch C for interruption of the load circuit. Series-connected in the circuit of coil 9 is a holding coil 26 of ratiometer Q2 which acts cumulatively relative to coil 18' in order to secure a safe switching operation once such an operation is initiated.

The performance of the apparatus as a whole is as follows. As long as no overload current occurs, the contact 12 of relay R remains open and contact 8 remains closed. In the event of an overload, the voltage across coil 11 increases sufficiently to close contact 12. Now a current, denoted by the arrow $i_R$, follows through coils 13 and 18 of ratiometer relays Q1 and Q2, this current being proportional to the load current. At that instant, the coil 13' is already excited in proportion to the rate of current change $$\left(\frac{di}{dt}\right)$$

while coil 18' is still unexcited. System 14—14' can respond only if the ratio $$\frac{i}{di/dt}$$

exceeds the value $\Delta t$ and then closes its contacts 16, 17 after the elapse of the switching interval $t$. In the moment of response of relay Q1, the voltage coil 18' of relay Q2 becomes excited. Relay Q2, however, can respond only when the current in winding 18 has decreased sufficiently to let the torque of armature 19' exceed that of the armature 19, i. e. when the ratio $$\frac{i}{di/dt}$$

drops below the value $\Delta t + \delta t$. This occurs at the moment $t'$ (Fig. 1) after the current $i$ has passed beyond its maximum value and approaches the next zero passage $t_2$. After elapse of the switching interval $\delta t$ (which in this embodiment has the same duration for both relays Q1 and Q2), i. e. at the moment $t''$, relay Q2 closes its contacts. Hence, the contacts of relay Q2 are closed an interval $\Delta t$ prior to the zero passage. Since at the moment $t''$ the ratio $$\frac{i}{di/dt}$$

drops below the value $\Delta t$, the relay Q1 starts opening its contacts thus initiating an interruption of the circuit of coil 18. However, since at the moment $t''$ the holding coil of relay Q2 is excited, the relay Q2 remains closed and, by energizing the coil 9, causes the switch C to open the main circuit at contact 8. Thereafter, the relays and switch C must be reset for renewed operation.

It will be recognized from the foregoing description that, in control apparatus according to Fig. 2, the ratiometer relay Q1 operates to prevent a release of the circuit interrupter for a period at least equal to $\Delta t + \delta t$ after each zero passage of the current, while the releasing control signal is issued by the relay Q2 at a moment which precedes the current zero passage by the interval $\Delta t$.

The control apparatus shown in Fig. 3 is equipped with only one ratiometer relay of the crossed-coil type which measures the algebraic value of the ratio $$\frac{i}{di/dt}$$

and issues a release-controlling impulse only when this value is negative. The circuit to be controlled extends between the terminals 31 and 32. It includes an iron-cored coil 33, an air-cored coil 34, and a current transformer 35—all traversed by the load current $i$. Numerals 36 and 37 denote ohmic resistors. The crossed-coil instrument or relay Q3 has stationary current coils 38 and 38', a movable current coil 39, and a movable voltage coil 40. Coils 39 and 40 are mechanically in rigid connection with each other and revolvable relative to a magnetizable field system (not shown) which is energized by current coils 38 and 38'. Ratiometers of this type are known. The revolvable system of coils 39 and 40 is mechanically connected with a normally open relay contact 41, the connection being schematically represented by a broken line 42. A switch 43, normally locked in closed position against the bias of a spring, is released if its control coil 44 is energized from a voltage source 45 due to the closing of contact 41. The system 39—40 is normally in a position where its movement in the opening sense of contact 41 is prevented, for instance, by a stop as indicated at 41'. Hence, a control movement occurs only if the torque ratio of coils 39 and 40 has the proper direction.

The apparatus according to Fig. 3 operates as follows. As long as the ratio $$\frac{i}{di/dt}$$

is positive, the crossed-coil system remains at rest because the resultant torque is then in the wrong direction. This condition obtains also when the ratio becomes negative, but only as long as the current-responsive torque of coil 39 is larger than the torque responsive to the rate of change ($di/dt$). In the moment when the two torques become balanced, the system starts moving to issue a control impulse at contact 41. After the next following zero passage of the current, the ratio.

$$\frac{i}{di/dt}$$

again becomes positive so that the system returns to the initial position to resume its blocking function. It will be recognized that in this apparatus, the blocking function and also the timed releasing function according to the invention are performed by a single instrumentality having but one ratiometric system. As explained previously, the series-arrangement of the iron-cored choke coil 33 with the air-cored coil 34 serves the purpose of having the control apparatus respond to low overload earlier than to high overloads.

In the embodiment of Fig. 4, the control relay proper consists of a ratiometer Q4 whose two magnetic field structures are denoted by 46 and 46'. The two appertaining moving armatures 47 and 47' are revolvable about a common axis and are rigidly interconnected as is indicated by the broken line 48. The angular deflection of the armature system serves to actuate a contact or the like control member for issuing a control impulse to a circuit breaker or other apparatus to be controlled (not shown). The field structure 46 is directly excited by the load current flowing in a conductor 49 which forms or includes an air-cored choke coil at 50 in series-arrangement with an iron-cored reactor or choke coil 51 whose iron core has an air gap. The coil 52 of field structure 46' is connected to conductor 49 across the series-arrangement of elements 50 and 51. A series resistor 52' permits adjusting or varying the period $\Delta t$. It is essential for this embodiment that the current-measuring field structure 46 of the ratiometer relay Q4, as well as the iron-cored reactor coil 51, are designed in the nature of one-conductor current transformers in order to afford maximum reliability in the event of short circuits. For the same reason, the air-cored choke coil 50 has preferably only a few turns, for instance, formed by the bus bar 49. A control system of such a design can be directly exposed to high voltage. A contact device, actuated by the moving system 47—47', for instance, through a lightweight insulating shaft of that system, may serve to close a circuit similar to those of coil 9 in Fig. 2 or coil 43 in Fig. 3, or the deflection of the moving system may be used for mechanically releasing a latch comparable, in general releasing function, to the latch actuated by coil 43 in Fig. 3.

While in the foregoing description of the illustrated embodiments, reference is made to synchronous switch equipment for interrupting a load circuit in response to abnormal current conditions, it should be understood that the invention is similarly applicable for the above-mentioned other purposes which require the issuance of a control stimulus or impulse in a given moment of a current or voltage wave. For instance, the illustrated embodiments are in substance also applicable for welding control, rectifying inverting and the like commutating purposes.

Figure 5:
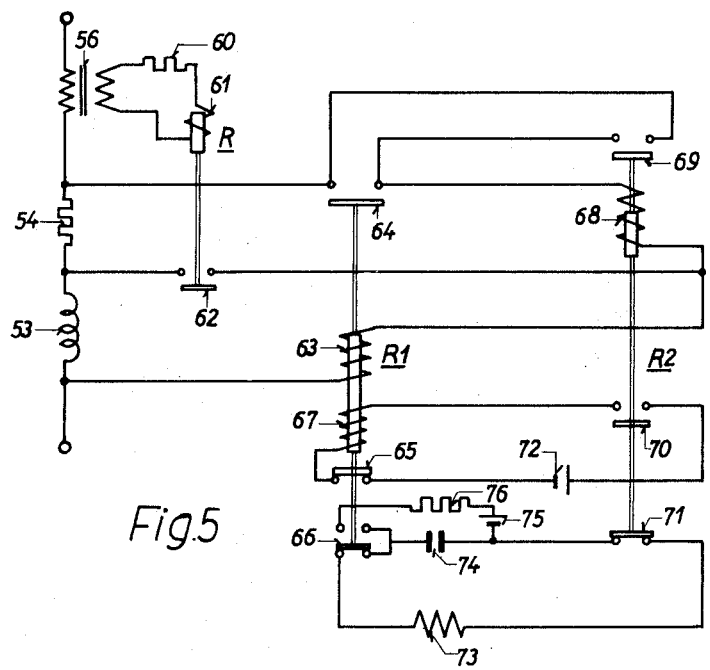

The embodiment illustrated in Fig. 5 represents a control apparatus with a blocking relay system R1 and a separate impulse transmitting relay system R2, and is so designed that the blocking system responds to a given minimum value of the rate of current change ($di/dt$). More particularly, the response is such that the blocking interval extends from the zero passage to the next following current maximum.

According to Fig. 5, the controlling circuit includes a choke coil 53, a resistor 54 and a transformer or the like coupling element 56. An overload-responsive relay R has its coil 61 connected through a resistor 60 to the transformer 56 and closes a contact 62 when the current exceeds a given overload value. The blocking relay system R1 has a main coil 63 which actuates contacts 64, 65 and 66, and is also equipped with a holdout coil 67 which, when energized, prevents the main coil 63 from actuating the relay. Relay R2 has a coil 68 and contacts 69, 70 and 71. A suitable source of direct current is denoted by 72. The device to be controlled is represented only by its control coil 73. The control is effected by means of discharge impulses which issue from a capacitor 74. A suitable source of direct current 75 serves to charge the capacitor 74 through a resistor 76.

While the relays R1 and R2 are schematically represented as having their movable systems gravity-biased, these two relays consist preferably of sensitive devices, for instance, with clapper-type armatures which are attracted toward the appertaining magnet when the relay coils are sufficiently energized and are pulled away from the magnet by a biasing spring when the energization drops below a minimum value. The coil 68 of relay R2, when its circuit is closed, is excited by the voltage drop across resistor 54 which is proportional to the load current. Consequently, relay R2 is capable of picking up at any time during each half-cycle period of the current wave and drops off at a point near the zero passage, for instance, as determined by the time point $t'$ in Fig. 1. The relay R1 has its main coil 63 excited by the voltage drop across coil 53 which is proportional to the rate of current change $di/dt$. Consequently, this relay tends to pick up at any time during the ascending or descending branches of the current wave, but drops off in the neighborhood of the current maxima or minima because the rate of current change is then virtually zero.

The apparatus operates as follows. As long as the load current remains below the value required for closing the contact 62 of relay R, both relays R1 and R2 are at rest in the illustrated position in which the capacitor 74 is discharged. When an overload occurs, and assuming that contact 62 closes at a time ahead of a current maximum, the coil 63 of blocking relay R1 is energized and picks up. Capacitor 74 is now charged through contact 66 but disconnected from the coil 73. Contact 64 energizes coil 68 of relay R2 which then closes a self-holding circuit at 69. When now the current reaches its maximum value, relay R1 drops off and closes at contact 65 the circuit of holding coil 67 with the effect that relay R1 cannot pick up again during the rest of the half-cycle. Relay R2 stays picked up as long as the instantaneous current has a high value, but drops off when the current approaches its zero passage. At that moment, the contact 71 closes so that a control impulse passes from capacitor 74 through coil 73. When the relay R1 picks up at a moment between a current maximum (or minimum) and the next following zero passage, it stays picked up until the next following current minimum (or maximum) so that the impulse is always transmitted at a definite moment shortly previous to a zero passage.

Figure 6:
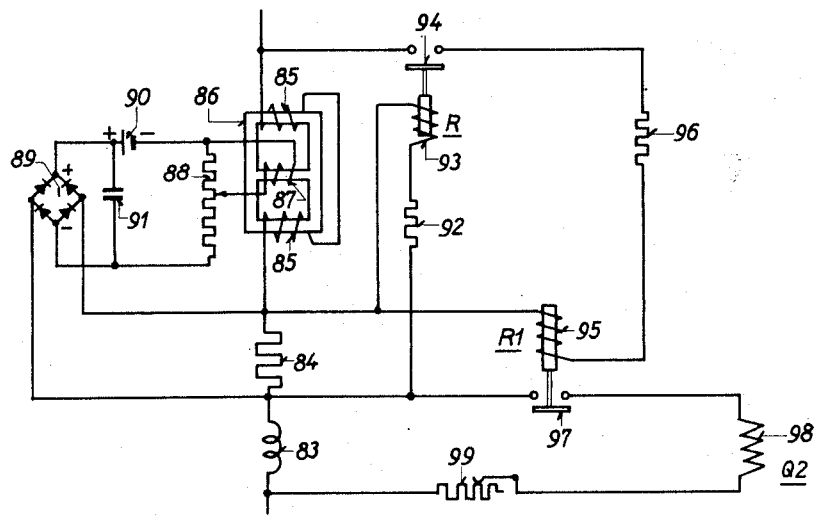

In the embodiment illustrated in Fig. 6, a choke coil 83, resistor 84 and the reactance winding 85 of a saturable reactor 86 are series-connected in the load circuit. The direct-current control coil 87 of reactor 86 is energized from a potentiometer rheostat 88 which is energized by two opposing voltage sources of which one consists of a full-wave rectifier 89 and the other of a current source 90 of constant voltage. A smoothing capacitor 91 is connected across rectifier 89. The primary voltage for rectifier 89 is supplied by the voltage drop across resistor 84. The same voltage drop energizes, through a resistor 92, the coil 93 of an overload relay R which closes its contact 94 only when the overload exceeds a given limit value. When contact 94 closes the coil 95 of a blocking relay R1, it is connected through a resistor 96 across the reactance winding 85. The blocking relay closes its contact 97 during an interval extending from the current zero passage, for instance, to the next following current maximum. When contact 97 closes, the coil 98 of a ratiometer Q2 becomes energized. This ratiometer is designed and connected to the device to be controlled, in the same manner as the ratiometer Q2 according to Fig. 2. Therefore, further details of the ratiometer are not illustrated in Fig. 6. The resistor 99 permits varying the energizing of Q2.

The performance of the apparatus according to Fig. 6 differs from those of the other embodiments in that the reactive resistance of the winding 85 is automatically controlled by the varying premagnetization effected by the control coil 87. This premagnetization decreases when the voltage drop across resistor 84 increases. As a result, the reactive resistance of reactor 86 increases with increasing load current. This has the effect of correspondingly varying the length of the blocking interval as explained in the foregoing.

I claim as my invention:

1. Alternating-current responsive control apparatus of timed response relative to the current half-wave period, comprising a circuit for alternating current having circuit means for providing a voltage dependent upon the magnitude of said current and circuit means for providing a voltage dependent upon the rate of change of said current, contact means for issuing a control impulse when actuated, two electromagnetic relay means connected to said two circuit means to be controlled by said two voltages, one of said relay means being responsive to a given voltage condition occurring during a current half-wave portion of increasing instantaneous current values and being disposed to prevent actuation of said contact means prior to response of said one relay means, and said other relay means being connected with said contact means for thereafter actuating it in response to another voltage condition.

2. Alternating-current responsive control apparatus, comprising a circuit for alternating current having a series member for providing a voltage dependent upon the magnitude of said current and having a series inductance member for providing a voltage dependent upon the rate of change of said current, contact means for issuing a control impulse when actuated, two electromagnetic relay means connected across said two members to be controlled by said voltages, one of said relay means being responsive to a given voltage condition occurring during a current half-wave portion of increasing instantaneous current values and being disposed to prevent actuation of said contact means prior to response of said one relay means, and said other relay means being connected with said contact means for thereafter actuating it in response to another voltage condition.

3. Alternating-current responsive control apparatus, comprising an electromagnetic control device having a member movable between two positions and a control coil for controlling said member, said device having a given switching interval from the starting moment of coil excitation to completion of performance, a main circuit for alternating current having circuit means for providing a voltage dependent upon the magnitude of said current and circuit means for providing a voltage dependent upon the rate of change of said current, relay means having two control circuits connected to said respective circuit means to be controlled by said respective voltages and having an output circuit connected to said control coil for exciting said coil in response to occurrence of given conditions of said magnitude and rate, and relay means for preventing said response during an initial portion of the current half-wave period at most equal to the difference between the half-wave period of said current and said switching interval.

4. Alternating-current responsive control apparatus, comprising a main circuit for alternating current having circuit means for providing a voltage dependent upon the magnitude of said current and circuit means for providing a voltage dependent upon the rate of change of said current, relay means having two control circuits connected to said respective circuit means to be controlled by said respective voltages and having an impulse transmitting output circuit controlled by said control circuits to respond to occurrence of given conditions of said magnitude and rate, and an overload relay having a control circuit connected with said main circuit to respond to a given magnitude of said current, said overload relay being connected with said relay means for controlling the latter so that said relay means can respond to said conditions only during the portion of the current half-wave period following the occurrence of said current magnitude.

5. Alternating-current responsive control apparatus, comprising an electromagnetic control device having a control coil, a main circuit for alternating current, first relay means connected with said main circuit and responsive to a given condition near the zero passages of said current, said first relay means having an output circuit connected to said control coil, and second relay means connected with said circuit and responsive to another given condition of sair current farther away from said zero passages than said first condition, said second relay means being connected with said first relay means for controlling the latter to be operative only after the response of said second relay means, whereby said device is controlled to operate only at a time of decreasing instantaneous current values.

6. Alternating-current responsive control apparatus, comprising a circuit for alternating current having circuit means for providing a voltage dependent upon the magnitude of said current and circuit means for providing a voltage dependent upon the rate of change of said current, a ratiometer relay having two control coils connected to said respective circuit means and having a movable contact member for issuing a control impulse when the ratio of said magnitude and rate passes through a given value, and relay means connected with said circuit and responsive to a given condition of said current other than those occurring near the current zero passages, said relay means being connected with said ratiometer relay for controlling the latter to be responsive to said given value only during the portion of half-wave period of said current subsequent to the response moment of said relay means.

7. Alternating-current responsive control apparatus, comprising a circuit for alternating current having circuit means for providing a voltage in accordance with the magnitude of said current and circuit means for providing a voltage in accordance with the rate of change of said current, a first ratiometer relay having a movable contact device and two coils connected to said respective circuit means for controlling said device in response to a given value of the ratio of said voltages, a second ratiometer relay having a movable contact device for issuing a control impulse when actuated and having two coils connected to said respective circuit means for actuating said latter device in response to a given value of said ratio, said contact device of said first relay being interposed between one of said coils of said second relay and said one circuit means connected with said one coil so as to permit said second relay to actuate said impulse transmitting contact device only during the portion of a current half wave subsequent to the moment of response of said first relay.

8. Control apparatus according to claim 1 comprising, in combination, an overload relay connected with said alternating-current circuit and having contact means connected with said electromagnetic relay means to permit operation of said electromagnetic relay means only when the magnitude of said current exceeds a given overload value, and a selective control switch connected with said overload relay for rendering it ineffective in order to make said electromagnetic relay responsive to current below said value.

9. In control apparatus according to claim 2, said inductance member comprising a reactor of non-linear characteristic in order to advance the moment of response of said contact means relative to the current period in dependence upon a decrease of the preceding current maximum.

10. In control apparatus according to claim 2, said inductance member comprising an air-core choke coil and an iron-core choke coil series connected with each other.

FRITZ KESSELRING.

REFERENCES CITED

The following references are of record in the file of this patent:

UNITED STATES PATENTS

| Number | Name | Date |
| --- | --- | --- |
| 1,287,232 | Chubb | Dec. 10, 1918 |
| 1,761,006 | Butcher | June 3, 1930 |
| 1,967,849 | Wideroe | July 24, 1934 |
| 1,967,850 | Wideroe | July 24, 1934 |
| 2,225,763 | Bayha | Dec. 24, 1940 |
| 2,241,973 | Aigner et al. | May 13, 1941 |
| 2,261,686 | Kesselring | Nov. 4, 1941 |
| 2,299,561 | Bivens | Oct. 20, 1942 |